(12) United States Patent
Carelli

(10) Patent No.: US 8,559,585 B2
(45) Date of Patent: Oct. 15, 2013

(54) COLD SHUTDOWN ASSEMBLY FOR SODIUM COOLED REACTOR

(75) Inventor: Mario D. Carelli, Greensburg, PA (US)

(73) Assignee: Westinghouse Electric Company LLC, Monroeville, PA (US)

( * ) Notice: Subject to any disclaimer, the term of this patent is extended or adjusted under 35 U.S.C. 154(b) by 1095 days.

(21) Appl. No.: 12/360,329

(22) Filed: Jan. 27, 2009

(65) Prior Publication Data

US 2009/0225926 A1    Sep. 10, 2009

Related U.S. Application Data

(60) Provisional application No. 61/025,873, filed on Feb. 4, 2008.

(51) Int. Cl.
*G21C 13/00* (2006.01)

(52) U.S. Cl.
USPC .......................................... 376/292; 376/219

(58) Field of Classification Search
USPC ................. 376/290, 277, 336, 327, 219, 292
See application file for complete search history.

(56) References Cited

U.S. PATENT DOCUMENTS

| | | | | |
|---|---|---|---|---|
| 3,228,847 A | * | 1/1966 | Parkinson et al. | 376/231 |
| 3,257,286 A | * | 6/1966 | Schluderberg et al. | 376/230 |
| 3,351,532 A | * | 11/1967 | Raab, Jr. et al. | 376/173 |
| 3,406,092 A | * | 10/1968 | Margen | 376/230 |
| 3,462,345 A | * | 8/1969 | Jabsen | 376/230 |
| 3,957,577 A | * | 5/1976 | Treshow | 376/230 |
| 3,959,072 A | | 5/1976 | Dupen | |
| 3,992,257 A | * | 11/1976 | Van Erp et al. | 376/336 |
| 4,076,583 A | * | 2/1978 | Ash et al. | 376/230 |
| 4,148,685 A | * | 4/1979 | Brandes | 376/226 |
| 4,304,632 A | * | 12/1981 | Bhate et al. | 376/336 |
| 4,407,773 A | * | 10/1983 | Woudstra | 376/299 |
| 4,584,167 A | | 4/1986 | Carelli | |
| 4,664,871 A | * | 5/1987 | Schoening | 376/219 |
| 4,716,008 A | * | 12/1987 | Leroy et al. | 376/237 |
| 4,770,845 A | * | 9/1988 | Barrus et al. | 376/336 |
| 4,789,519 A | * | 12/1988 | Schoening et al. | 376/381 |
| 5,606,582 A | * | 2/1997 | Bergamaschi | 376/233 |
| 6,185,269 B1 | | 2/2001 | Hui | |

OTHER PUBLICATIONS

Dupen, Self-Actuated Shutdown System for a Commercial Size LMFBR, NP-846, Aug. 1978.*
Sowa et al., "LMFBR Self-Actuated Shutdown Systems", International Meeting on Fast Reactor Safety and Related Physics, Chicago, Illinois. Oct. 5-8, 1976.*
Jim Cahalan, "Sodium Fast Reactor, Safety #2", Presentation at DOE/HQ, Oct. 31, 2007.*
10 CFR 50, Appendix A, Section III, Jan. 1994.*

(Continued)

*Primary Examiner* — Timothy A Brainard
(74) *Attorney, Agent, or Firm* — Joseph C. Spadacene; Westinghouse Electric Company LLC

(57) ABSTRACT

A tertiary shutdown system for a liquid metal reactor that eliminates the need for considering an ATWS in setting the thermal power limits of the reactor. The shutdown system includes a reservoir of neutron absorber material that is sealed by a valve that may actively dispense the absorber upon operator command, into a stagnant pool of sodium in the core that is confined to prevent the absorber material from entering the coolant flowing through the core. Additionally, the valve may be passively open to release the absorber material into the stagnant pool of sodium when the temperature at the valve exceeds a predetermined limit.

14 Claims, 3 Drawing Sheets

(56) References Cited

OTHER PUBLICATIONS

Deane et al., "Design Criteria for a Self-Actuated shutdown System to Ensure Limitation of Core Damage," DOE/SF/710—T45, Sep. 1981.*

Tzanos, et al., Design-Related Inherent Safety Characteristics in Large LMFBR Power Plants, International Meeting on Fast Reactor Safety and Related Physics, Chicago, Illinois, Oct. 5-8, 1976.*

Advance gas cooled reactor, http://.sccs.swarthmore.edu/users/08/ajb/tmve/wiki100k/docs/Advance_gas-cooled_reactor.html, accessed Feb. 24, 2012.*

* cited by examiner

COLD SHUTDOWN ASSEMBLY FOR SODIUM COOLED REACTOR

CROSS REFERENCE TO RELATED APPLICATION

This application claims priority to Provisional Application Ser. No. 61/025,873, filed Feb. 4, 2008.

BACKGROUND OF THE INVENTION

1. Field of the Invention

This invention relates generally to liquid metal reactors and more particularly to a shutdown system for sodium cooled reactors.

2. Description of Related Art

The liquid metal fast breeder reactor (LMFBR) operates on the uranium-plutonium fuel cycle or thorium-$U^{233}$ fuel cycle. The reactor is fueled with bred-isotopes of plutonium in the core, and the blanket is natural or depleted uranium. In theory, the number of fission neutrons emitted per neutron absorbed by $Pu^{239}$, increases monotonically with increasing neutron energy for energies above about 100 keV. That means that the breeding ratio and breeding gain increase with the average energy of the neutrons inducing fission in the system. Therefore, every effort must be made to prevent the fission neutrons in a fast reactor from slowing down. This means the light-weight nuclei must largely be excluded from the core. The LMFBR has no moderator, so the core and blanket contain only fuel rods and coolant.

At the present, sodium is the chosen coolant for the modern LMFBR with an atomic weight of 23, sodium does not appreciably slow down neutrons by elastic scattering. Since sodium is an excellent heat transfer material, an LMFBR can be operated at high power density. This, in turn, means that the LMFBR core can be comparatively small. Furthermore, because sodium has a very high boiling point, the reactor core loops can be operated at high temperature and at essentially atmospheric pressure without boiling, and no heavy pressure vessel is required. The high coolant temperature also leads to high temperature, high pressure steam, and to high plant efficiency. Finally, sodium, unlike water, is not corrosive to many structural materials. The reactor components immersed in liquid sodium for years appear like new after the excess sodium has been washed off.

However, sodium has some undesirable properties. Its melting point is much higher than room temperature, so the entire cooling system must be heated before startup. This is accomplished by winding a spiral of insulated heating wire along the coolant piping, valves, and the rest of the system. Sodium is also highly chemical reactive. Hot sodium reacts violently with water and catches fire when it comes in contact with air, emitting dense clouds of white sodium peroxide smoke.

Unfortunately, sodium absorbs neutrons, even fast neutrons, leading to the formation of the beta-gamma emitter $Na^{24}$, with a half-life of 15 hours. Sodium, which passes through the reactor core, therefore becomes radioactive. LMFBR plants operate on the steam cycle, that is, the heat from the reactor is ultimately utilized to produce steam in steam generators. However, because of the radioactivity of the sodium and because sodium reacts so violently with water, it is not considered a sound engineering practice to carry the sodium directly from the reactor to the steam generators. Leaks have often occurred in steam generators between the sodium on one side and the water on the other, and such leaks could lead to the release of radioactivity.

Therefore, all LMFBRs have two sodium systems: the primary system cooling the core and carrying radioactive sodium, and an intermediate system with a sodium-to-sodium intermediate heat exchanger before going to the steam generator. Thus, a hypothetical sodium water reactor will involve non-radioactive sodium. The physical arrangement of LMFBRs can be divided into two categories: the loop-type LMFBR and the pool-type LMFBR. Issues concerning the operation of the core to which this invention relates for all practical purposes are the same for both types of LMFBRs. The loop-type is a more familiar design, because except for the presence of the intermediate loop, it is not much different in design from an ordinary pressurized water reactor. All primary loop components, the reactor, pumps, heat exchangers, etc. are separate and independent. In a pool reactor all the primary system components are immersed in the primary vessel. This makes inspection, maintenance, and repairs more complicated as these components are immersed in hot, radioactive, and opaque sodium. However, the shielding requirements of a pool reactor are reduced.

Furthermore, the usual practice is to locate pool-type reactor vessels at least partially underground, so that only the upper-most portion of the vessel requires heavy shielding. It is possible to walk into the reactor room where a pool-type reactor is operating and even walk across the top of the reactor without receiving a significant radiation dose. Therefore, the pool-type LMFBR can be very tight and compact.

As an example, a pool-type of LMFBR 10 is illustrated in FIG. 1. A reactor core 16, which is the heat generation source, is supported within a pool of sodium 12 that is maintained within a vessel 14 under an inert cover gas 26 which is sealed by the vessel cover 15. A primary coolant pump 18 is suspended from the vessel cover 15 and extends into the sodium pool 12 with an intake 20 at its lower end. The sodium intake is driven through the core inlet piping 22 to an inlet plenum 23 below the core 16 from which it enters the core 16 and is heated to temperatures in the order of 930° F. (500° C.). The radioactive heated sodium then exits the core 16 through an upper plenum which directs the heated sodium through core outlet piping 24 and into the primary side of intermediate heat exchanger 28 where it is placed in heat exchange relationship with sodium passing through intermediate loop piping 32 which is driven by the pump 30. The sodium in the intermediate loop piping 32 is then conveyed to a secondary heat exchanger 34 which places the sodium in heat exchange relationship with water to generate high pressure steam which is conveyed through the steam piping 36 to drive turbine 38. The condensate is then returned to the heat exchanger 34 to close the cycle. The turbine 38 can then be used to drive a generator 40 for the production of electricity 42.

A core map of the core 16 shown in FIG. 1 is provided in FIG. 2. The core comprises an array of fuel assemblies which are hexagonal stainless steel cans, for example, that are ten to fifteen centimeters across and three or four meters long that contain the fuel and fertile material in form of long pins. Typically, an assembly for the central region of the reactor contains fuel pins at its center and blanket pins at its periphery. Assemblies for the outer part of the reactor contain only blanket pins. When these assemblies are placed together, the effect is to create a central cylindrical driver surrounded on all sides by the blanket.

The fuel pins, for example, are stainless steel tubes six or seven millimeters in diameter, containing pellets composed of the mixture of oxides of plutonium and uranium. The equivalent enrichment of the fuel, that is plutonium, range between 15-35% depending on the reactor in question. The fuel pins are kept apart by spaces or in some cases by wire wound helically along each pin. The pins in the blanket, which contain only uranium dioxide are comparatively larger in diameter, for example, about 1.5 centimeters, because they require less cooling than the fuel pins. Both fuel and blanket pins are more tightly packed in an LMFBR than in a water cooled reactor because the heat transfer properties of sodium are so much better than those of water. As mentioned above, the liquid sodium coolant enters through holes near the bottom of each assembly, passes upward through the pins, removing heat as it goes, and then exits at the top of the core.

For safety LMFBR are provided with a (primary) control system which is also able to obtain reactor shutdown, and a (secondary) system with a dedicated shutdown function. The two systems employ independent and diverse means to attain reactor shutdown. In addition, sodium cooled reactors can have excellent intrinsic safety because of strongly negative reactivity coefficients. If properly designed, the reactivity coefficients can bring the reactor to a hot shutdown (criticality) even if both control/shutdown systems are inoperative (this event is called ATWS (Anticipated Transient Without Scram)). Even though ATWS are theoretically Beyond Design Basis Accidents, they are actually factored into the design in current practice. Typical design requirements for ATWS events are: no significant fuel failures, high margin to sodium boiling, and long-term structural temperatures maintained below the ASME Level D primary system boundary limit (700° C., 1,300° F.). As mentioned, current sodium reactors have two control systems (primary and secondary) of diverse design and failure of both is considered an acceptable risk, i.e., the probability of shutdown failure is less than $10^{-7}$ per demand. However, the temperature increase during a hypothetical ATWS is included in the transient design, i.e., the reactor power is such that limiting conditions are not exceeded during an ATWS. This results in the imposition of a large design margin and it lowers the rated power of the reactor. Accordingly, the key object of this invention to eliminate the need to consider an ATWS in setting up the thermal power limits of the reactor, resulting in an economically competitive design. The threshold limit for negation of the ATWS is $10^{-8}$ events/yr. which is the value assumed for failure of the reactor vessel in LWRs, an event which is not considered in the design of LWRs.

SUMMARY OF THE INVENTION

This invention achieves the foregoing objective by introducing a tertiary cold shutdown system. This system is independent and of a different type from the primary and secondary shutdown systems. The tertiary cold shutdown system is located in the center of the core of the sodium reactor and is capable of bringing the reactor to cold shutdown following an ATWS. The cold shutdown system will be actuated either passively or actively. Its adoption enables the reactor power to be increased approximately 10%.

Thus, in accordance with this invention, a nuclear reactor is provided with a nuclear core having a plurality of fuel assemblies; a primary shutdown system including a first neutron absorbing material and a first activation system for activating the first neutron absorbing material to absorb neutrons within the core among at least some of the fuel assemblies; a secondary shutdown system including a second neutron absorber material and a second activation system for activating the second neutron absorber material to absorb neutrons within the core among at least some of the fuel assemblies; a tertiary shutdown system including a third neutron absorber material and a third activation system for activating the third neutron absorber material to absorb neutrons within the core among at least some of the fuel assemblies; and wherein the first, second and third activation systems are independent of each other and respectively employ differently designed activation mechanisms that operate on different principles to activate the corresponding first, second and third neutron absorber materials.

In one preferred embodiment, the first activation system at least partially inserts the first neutron absorber material into the core when activated; the second activation system at least partially inserts the second neutron absorber material into the core when activated; and the third activation system substantially inserts all of the third neutron absorber material into the core when activated. Preferably, the third activation system inserts the third neutron absorber material into the core symmetrically about a central axis of the core. Desirably, the tertiary shutdown system is both passively and manually activated. In one embodiment, the tertiary shutdown system is passively activated when the core temperature exceeds a predetermined limit.

In a preferred embodiment, the tertiary shutdown system includes a reservoir above the core that holds the third neutron absorber material when the tertiary shutdown system is not activated. The reservoir is connected through a valve to a central conduit that extends down substantially in the center of the core. The valve opens when the tertiary shutdown system is activated to insert the third neutron absorber material substantially into the conduit within the core. Desirably, the central conduit is at least partially filled with a static column of the reactor coolant. Preferably, the central conduit includes a closure for closing off the bottom end of the central conduit to prevent the third neutron absorber material from passing from the central conduit into the core when the tertiary shutdown system is activated. In one embodiment, the closure is pervious to a coolant flowing through the core so that the central conduit is at least partially filled with the coolant when inserted into the coolant in the core. In another embodiment, the closure is impervious to a coolant flowing through the core and seals a static pool of coolant within the central conduit.

Desirably, the reservoir, the valve and the central conduit can be removed from the core as an integral assembly once activated, for replacement. Preferably, at least two neutron absorber materials, i.e., the second neutron absorber material, and the third neutron absorber material have different chemical compositions, and preferably all three neutron absorber materials have different compositions.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

This invention relates to a shutdown system for the core of a sodium reactor, which is capable of bringing the reactor to cold shutdown following a ATWS. The shutdown system of this invention is of a different type from that of the primary and secondary shutdown systems of a traditional LMFBR, which in an ATWS are presumed not to be operational. The cold shutdown system of this invention is actuated either passively or actively. Its adoption permits an increase in the rated reactor power by approximately ten percent.

Figure 1:
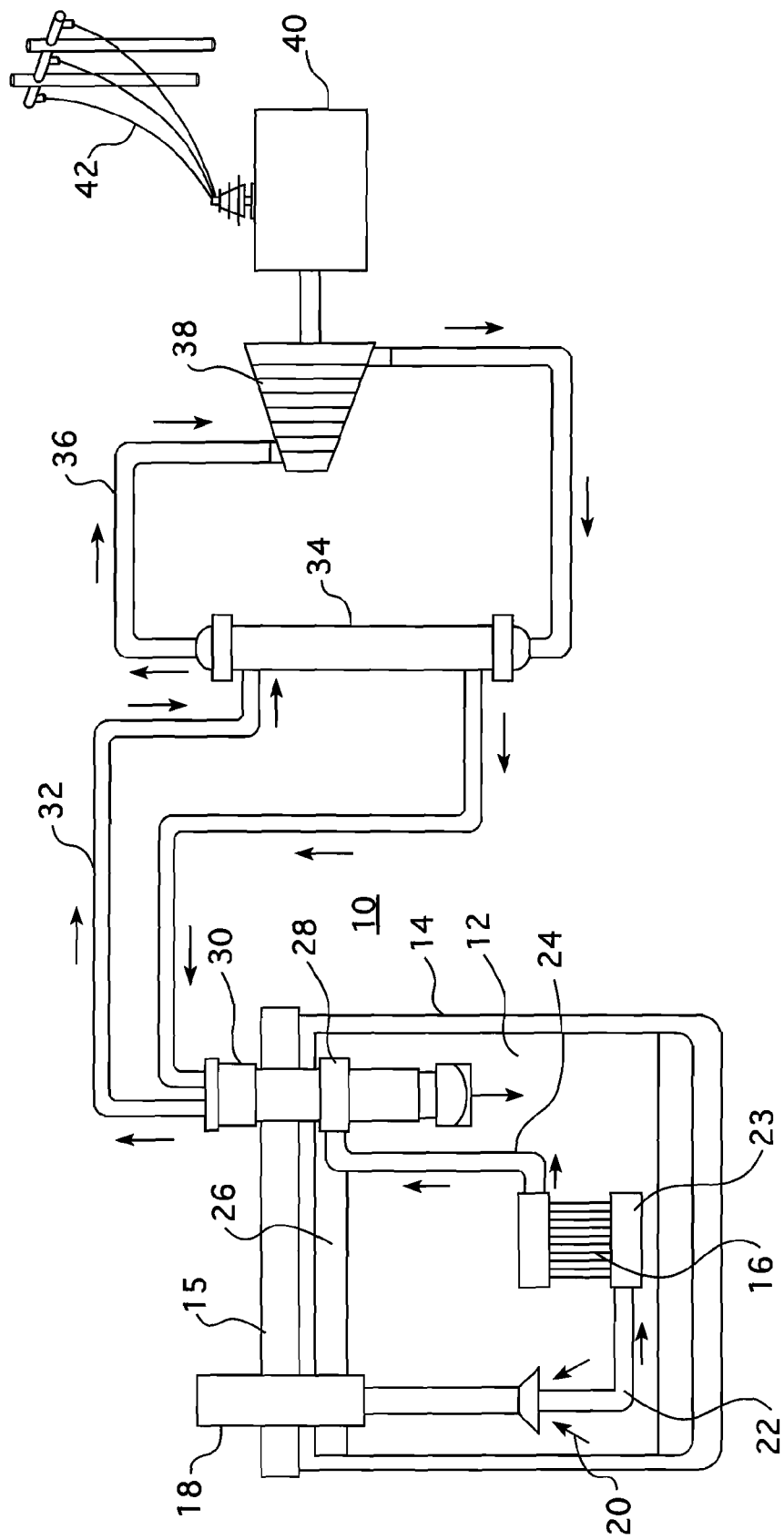
FIG. 1 is a schematic of a pool-type LMFBR.
Figure 2:
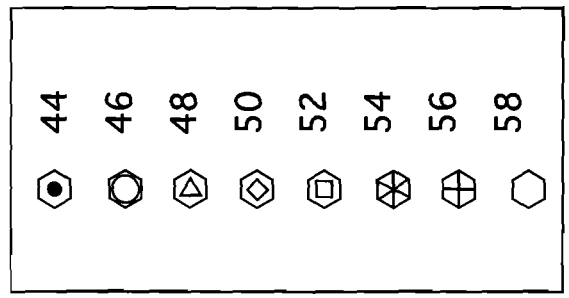
FIG. 2 is a core map from an exemplary LMFBR that incorporates the principles of this invention.
Figure 2:
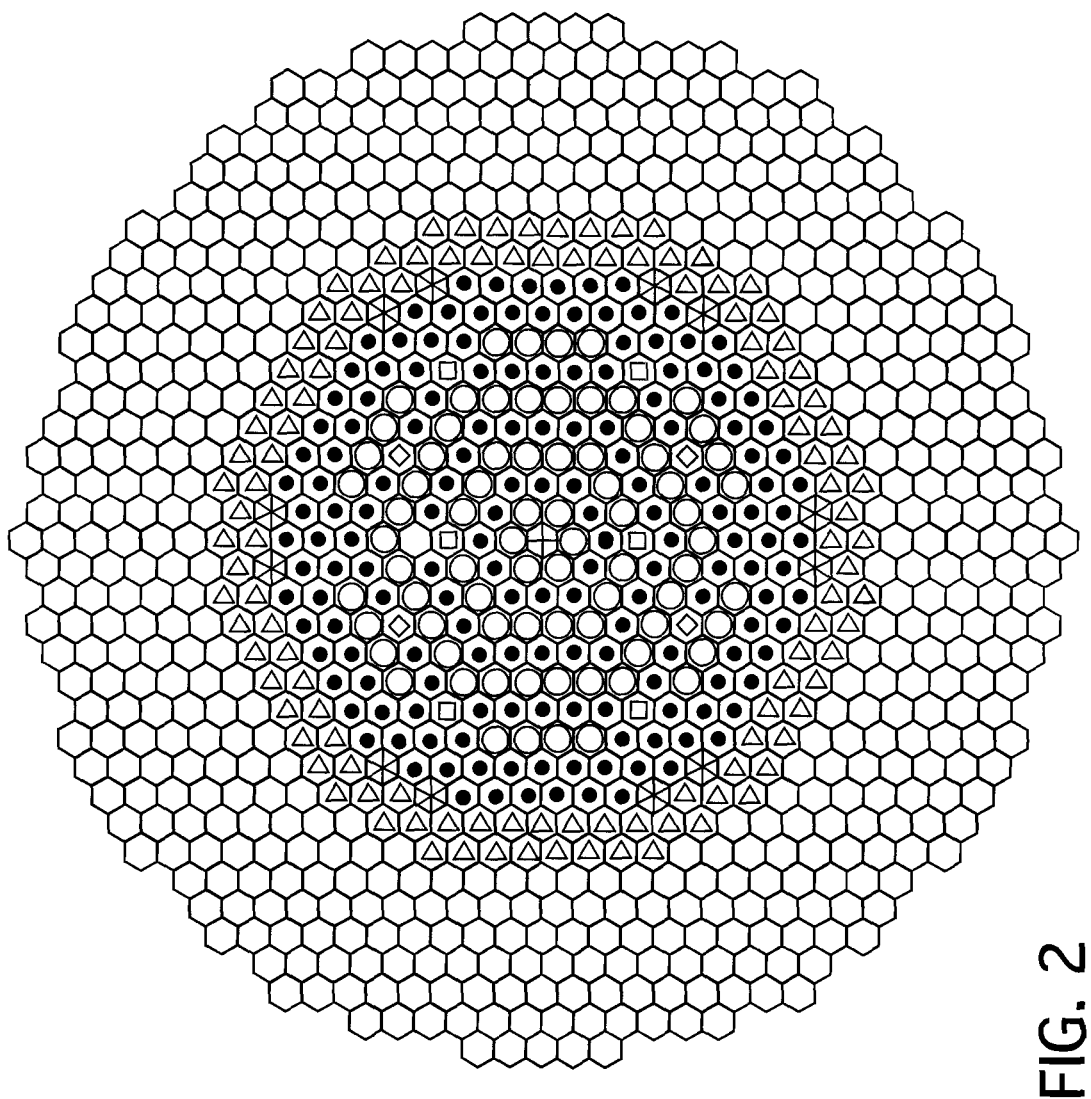

Sodium cooled reactors can have excellent intrinsic safety because of strongly negative reactivity coefficients. If properly designed, the reactivity coefficient can bring the reactor to hot shutdown (critical) even if the traditional primary and secondary shutdown systems are inoperative (ATWS). Current sodium reactors have two control systems (primary and secondary) of diverse design and failure of both is considered an acceptable risk, i.e., the probability of shutdown failure is less than $10^{-7}$ per demand. However, the core temperature increase during a hypothetical ATWS has to be included in the transient design, i.e., so that the reactor power does not exceed the limiting conditions of the reactor materials during an ATWS. The objective of this invention is to provide a reactor design that eliminates the need for consideration of ATWS in setting up the thermal power limits of the reactor. A core map of a heterogeneous sodium reactor core 16, with a thermal power of 1,000 MWt and a central cold shutdown system in accordance with this invention is shown in FIG. 2. The fuel assemblies are designated by the symbol 44 and are dispersed around the central portion of a core. Inner blanket assemblies, designated by the symbol 46, are interspersed among the fuel assemblies 44 at a number of radial coordinates. A radial blanket designated by the symbol 48 comprising two rows of blanket assemblies extends around the periphery of the fuel assemblies. Primary control rods designated by the symbol 50 and secondary control rods designated by the symbol 52 are interspersed among the fuel rod assemblies and the inner blanket assemblies. GEMS 54 are positioned in pairs at six equally spaced circumferential locations around the outer circumference of the fuel assemblies and a cold shutdown assembly 56, in accordance with this invention, is located in the center of the core. The outer periphery of the radial blanket assemblies 48 are surrounded by a number of rows of shielding assemblies 58, all as shown in FIG. 2.

GEMs are reactivity feedback devises that were developed at the Fast Flux Test Facility in Hanford, Wash., to increase neutron leakage from a liquid metal reactor core during events caused by a loss of pumped primary coolant flow. They act as a variable reflector when placed in the inner row of the core reflector. A helium gas bubble trapped inside the assembly expands when the core inlet pressure decreases and expels sodium from the assembly. The sodium loss decreases the reflection of neutrons back into the core. The resulting negative reactivity feedback contributes to passive reactor shutdown in the unlikely event that the protection system fails to operate.

Whereas, as previously mentioned, a tertiary cold shutdown system 56 in accordance with this invention is located in the center of the core 16. This location is chosen as it has the highest reactivity worth and is thus the most effective. Preliminary analyses have indicated that one to seven positions are necessary to provide the necessary shutdown, depending upon reactor size. An additional benefit of locating a shutdown system in the central core position is that a fuel (or blanket) assembly in that location, because of the high worth, becomes a "special" case behaving differently from the other assemblies and requires individual orificing as well as individual assembly shuffling (in a heterogeneous configuration) or earlier removal (in a homogeneous configuration). The core size of 1,000 MWt shown in FIG. 2 is only provided for illustration and the invention described herein is applicable to all core sizes, with smaller cores requiring only the central position and larger ones requiring up to seven positions symmetrically situated around the center of the core.

An ATWS is by definition a transient occurring without the intervention of both the primary and the secondary control systems, which are different to provide shutdown diversity. Generally, the primary system which is mostly for control is represented by absorber rods that are actively actuated mechanically driving the absorber rods into or out of the core. The secondary control system used for shutdown also comprises control rods, however, they are actuated differently, generally passively. A commonly proposed secondary system is the self-actuated shutdown system (SASS) where the rods are held by a magnet with a Curie Point corresponding to the highest acceptable temperature. To avoid any possibility of common mode failure, the tertiary cold shutdown system must be completely different from both the primary and secondary control systems, both in absorber configuration and in method of actuation.

Even though the ATWS are considered beyond design basis accidents, it has been common practice to design the reactor such that their occurrence does not cause core damage. This effectively limits the rated power, because the limiting temperatures (for example, fuel for Unprotected Transient Over Power (UTOP), cladding and coolant for Unprotected Loss Of Coolant (ULOC) and Unprotected Loss Of Heat Sink (ULOHS) accidents) increase significantly before the reactivity coefficients turn the accident around and bring the reactor to hot shutdown. Use of the tertiary cold shutdown assemblies 56 negates the occurrence of the ATWS, which therefore does not have to be accounted for in setting the rated power level.

Consequently, the power margin previously set aside to cope with the ATWS can now be utilized as a corresponding increase in the reactor power rating. Preliminary evaluations indicated that this power increase is about 10%. Finally, the tertiary system should be able to have both active and passive actuation. The active actuation is to provide cold shutdown capability on demand, while the passive initiation is to guarantee that the limiting temperatures are not exceeded. The threshold will be high enough (e.g., bulk coolant temperature of approximately 1,600° F. (870° C.)) such that spurious scrams do not occur while still maintaining the reactor response within the prescribed requirements.

It was conservatively assumed that the failure probability of shutdown systems was of the order $10^{-3}$ to $10^{-4}$, so the probability of an ATWS is of the order of $10^{-7}$. With the adoption of the tertiary control system the probability of core damage becomes $10^{-10}$ or less, which is well below the $10^{-8}$ threshold and removes the ATWS from design limit considerations.

Figure 3:
FIG. 3 is a schematic of the storage reservoir of the tertiary shutdown system of this invention.
Figure 4:
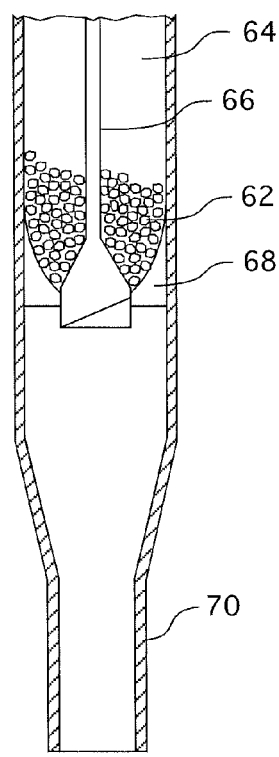
FIG. 4 is a sectional schematic of a portion of the storage reservoir shown in FIG. 3 illustrating the valve that separates the storage reservoir from the core in a closed position.
Figure 5:
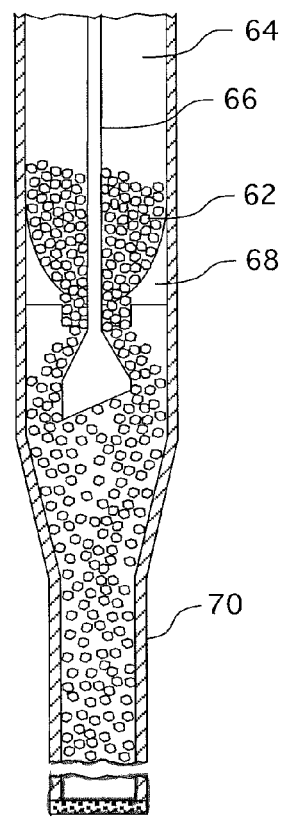
FIG. 5 is the cross sectional schematic shown in FIG. 4 with the valve in an open position and the third neutron absorber material being delivered into the core.

As mentioned, the tertiary, cold shutdown system has to be different from the commonly adopted primary and secondary control systems both in absorber configuration and insertion actuation. Thus, eliminated from consideration are control rod assemblies and electromagnetic hold systems, with release either active or passive. The control element storage canister 60 of this invention, illustrated in FIGS. 3, 4 and 5, is an assembly containing absorber balls 62 in a reservoir 64 supported above the core. Release of the balls is activated either through an operator triggered plunger 66, which ruptures a diaphragm 68 supporting the absorber balls 62 or passively through a temperature sensitive gate opener which releases the ball 62, e.g., a specific melting temperature diaphragm 68 or the thermal elongation of a trigger lever that activates the plunger 66. Neutron absorbers such as $B_4C$ or Hf can be used. $B_4C$ has a higher cross section than Hf, but also higher potential for self-welding of the absorber balls 62 in a sodium environment. The absorber geometry does not necessarily have to be in the form of balls, for example, a liquid absorber can be used. The absorber balls 62 fall into a reservoir or conduit 70 within the core. The conduit 70 is filled with stagnant sodium to avoid coolant contamination and distortion of the core coolant flow and temperature distribution. The conduit 70 is either completely sealed at its lower end or provided with a closure that is pervious to sodium but impervious to the absorber material to avoid coolant contamination. The central positions occupied by the cold shutdown systems can vary from one, i.e., a central assembly, to seven, i.e., assemblies in the center and in the first row, depending on the core characteristics. It is expected that for most designs, four positions, (i.e., central plus positions 120° apart in the first row) will suffice. FIG. 3 shows the storage canister 60 that forms the reservoir 64 above the core with a lower narrow neck that connects with the core conduit 70. FIG. 4 is a schematic view of a cross section that shows the plunger 66 rupturing the membrane 68. FIG. 5 shows the plunger 66 through the membrane 68 with the absorber balls 62 falling into the stagnant pool of sodium in the conduit 70.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear reactor comprising:
a nuclear core;
a plurality of fuel assemblies within the core;
a primary shutdown system including a first neutron absorber material and a first activation system for activating the first neutron absorber material to absorb neutrons within the core among at least some of the fuel assemblies;
a secondary shutdown system including a second neutron absorber material and a second activation system for activating the second neutron absorber material to absorb neutrons within the core among at least some of the fuel assemblies;
a tertiary shutdown system including a third neutron absorber material and a third activation system for activating the third neutron absorber material to absorb neutrons within the core among at least some of the fuel assemblies, wherein when the third activation system is activated the third activation system is configured to insert the third neutron absorber material into the core with the third neutron absorber material substantially concentrated in the center of the core; and
wherein the first, second and third activation systems are independent of each other and respectively employ differently designed activation mechanisms that operate on different principles to activate the corresponding first, second and third neutron absorber materials.

2. The nuclear reactor of claim 1 wherein the first activation system at least partially inserts the first neutron absorber material into the core when activated; the second activation system at least partially inserts the second neutron absorber material into the core when activated; and the third activation system inserts substantially all of the third neutron absorber material into the core when activated.

3. The nuclear reactor of claim 1 wherein the tertiary shutdown system is both passively and manually activated.

4. The nuclear reactor of claim 3 wherein the tertiary shutdown system is passively activated when the core temperature exceeds a predetermined limit.

5. The nuclear reactor of claim 1 wherein the tertiary shutdown system comprises a reservoir above the core that holds the third neutron absorber material above the core when the tertiary shutdown system is not activated; the reservoir being connected through a valve to a central conduit that extends down substantially through the center of the core and the valve opening when the tertiary shutdown system is activated to insert the third neutron absorber material substantially into the conduit within the core.

6. The nuclear reactor of claim 5 wherein the core is cooled by a liquid metal coolant that flows through the core and the central conduit is at least partially filled with a static pool of the liquid metal.

7. The nuclear reactor of claim 5 including a closure for closing of a bottom end of the central conduit to prevent the third neutron absorber material from passing from the central conduit into the core when the tertiary shutdown system is activated.

8. The nuclear reactor of claim 7 wherein the closure is pervious to a coolant flowing through the core so that the central conduit is at least partially filled with coolant when inserted into the coolant in the core.

9. The nuclear reactor of claim 7 wherein the closure is impervious to a coolant flowing through the core and seals a static pool of coolant within the central conduit.

10. The nuclear reactor of claim 7 wherein the reservoir, the valve and the central conduit can be removed from the core as an integral assembly once activated, for replacement.

11. The nuclear reactor of claim 1 wherein the first, second and third activation systems are independent of each other and respectively employ differently designed activation mechanisms that operate on different principles to activate the corresponding first, second and third neutron absorber materials and wherein at least two of the first neutron absorber material, the second neutron absorber material and the third neutron absorber material have different chemical compositions.

12. The nuclear reactor of claim 11 wherein the first neutron absorber material, the second neutron absorber material and the third neutron absorber material each have different chemical compositions from another.

13. The nuclear reactor of claim 1 wherein the reactor is a Liquid Metal Fast Reactor, with a burner function.

14. The nuclear reactor of claim 1 wherein the reactor is a Liquid Metal Fast Reactor, with a breeder function.

* * * * *